(12) United States Patent
Moon

(10) Patent No.: US 6,371,622 B1
(45) Date of Patent: Apr. 16, 2002

(54) AUXILIARY LIGHT SOURCE UNIT FOR REFLECTIVE LIQUID CRYSTAL DISPLAY

(75) Inventor: Jeong Min Moon, Kyounggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/692,104

(22) Filed: Oct. 20, 2000

(30) Foreign Application Priority Data

Apr. 14, 1999 (KR) ............................................. 99-13183

(51) Int. Cl.[7] ............................................... G01D 11/28
(52) U.S. Cl. .............................. 362/28; 362/33; 362/85; 349/61
(58) Field of Search ............................. 362/33, 28, 85, 362/253; 345/102; 349/61, 63, 68

(56) References Cited

U.S. PATENT DOCUMENTS 6,273,581 B1 * 8/2001 Neiser ......................... 362/109

FOREIGN PATENT DOCUMENTS

JP 10-246886 9/1998

* cited by examiner

*Primary Examiner*—Sandra O'Shea
*Assistant Examiner*—Hargobind S. Sawhney
(74) *Attorney, Agent, or Firm*—Long Aldridge & Norman LLP

(57) ABSTRACT

An auxiliary light source apparatus for radiating light onto a reflective liquid crystal display is disclosed. In the apparatus, a reflective display module is pivotally connected to a main body. A support member is opened and closed from and to a position adjacent to the main body in opposition to the reflective display module. An auxiliary light source is installed at the support member to radiate light onto the display area of the reflective display module. Accordingly, the auxiliary light source apparatus for the reflective liquid crystal display is connected to the main body in a position in opposition to the reflective liquid crystal display panel so that a light can be uniformly radiated onto the reflective liquid crystal display panel.

17 Claims, 11 Drawing Sheets

AUXILIARY LIGHT SOURCE UNIT FOR REFLECTIVE LIQUID CRYSTAL DISPLAY

This application claims the benefit of Korean Patent Application No. 1999-13183, filed on Apr. 14, 1999, which is hereby incorporated by reference.

BACKGROUND OF THE INVENTION

1. Field of the Invention

The present invention relates to a reflective liquid crystal display, and more particularly to an auxiliary light source unit for radiating light onto a reflective liquid crystal display.

2. Discussion of the Related Art

A liquid crystal display (LCD) is a flat panel display device having advantages of small bulk, thin thickness and low power consumption. LCDs have been used in connection with portable computer devices such as notebook personal computers, office automation equipment and audio/video machinery, etc. LCDs control an electric field applied to a liquid crystal material having a dielectric anisotrophy to transmit or shut off a light, thereby displaying a picture or an image. LCDs use an external light source, unlike display devices that generate light internally, such as an electroluminescence (EL) device, a cathode ray tube (CRT), a light emitting diode (LED) and so on.

LCD devices are largely classified into transmissive type devices and reflective type devices, depending on the method of utilizing light. The transmissive type LCDs includes a liquid crystal panel having a liquid crystal material injected between two transparent substrates and a backlight unit for supplying light to the liquid crystal panel. However, it is difficult to make a transmissive LCD with thin thickness and light weight. Moreover, the backlight units of transmissive LCDs have excessive power consumption.

On the other hand, reflective type LCDs include a reflective liquid crystal display panel 10 that transmits and reflects natural light and peripheral light to and from the display screen without a backlight unit. As shown in FIG. 1, reflective liquid crystal panel 10 consists of a liquid crystal panel 2 in which a liquid crystal material is injected between two transparent substrates and a reflector 4 arranged at the rear side of the liquid crystal panel 2 or arranged at the interior of the liquid crystal panel 2 to reflect a light toward the viewing side. This reflective LCD reflects natural light or peripheral light by means of the reflector 4 to display a picture or an image. However, the reflective LCD has a considerably low brightness level when the natural light or peripheral light is not sufficient. In order to solve this problem, there has been suggested a reflective LCD using auxiliary light source other than natural light.

FIG. 2 shows a reflective LCD employing a point light source disclosed in the magazine, *Nikkei Electronics Asia*, published in July 1998. Referring to FIG. 2, the conventional reflective LCD includes a reflective liquid crystal panel 12, a support bar installed at one side of the reflective liquid crystal panel 12, and an auxiliary light source 16 as a point light source installed at the edge of the support bar 14. The auxiliary light source 16 radiates light onto the reflective liquid crystal display panel 12 from a certain distance by means of the support bar 14. Because the auxiliary light source 16 of the reflective LCD has a point light source and because the support bar 14 is installed at the corner of the reflective liquid crystal panel 12, the incidence angle of the light provided by the auxiliary source on the display screen is different at every incident position. Thus, the quantity of light at each incident position differs considerably on the reflective LCD device. Accordingly, the brightness of the reflective LCD is non-uniform because the LCD is not illuminated with a uniform quantity of light.

FIG. 3 shows a reflective LCD disclosed in U.S. Pat. No. 5,477,239. Referring to FIG. 3, the conventional reflective LCD shown includes a display module 24 pivotally attached to a main body. The display module 24 houses a reflective liquid crystal display panel 22 and auxiliary light sources 26a and 26b. Auxiliary light sources 26a and 26b are line light sources at the left and right sides of the reflective liquid crystal display panel 22. Each auxiliary light source 26a and 26b is installed in such a manner to be opened and closed on the display module 24. Each auxiliary light source 26a and 26b radiates light onto the surface of the reflective liquid crystal display panel 22. A film (not shown) is adhered to an upper glass substrate of the reflective liquid crystal display panel 22. This film includes a number of minute structures for reflecting light received from the auxiliary light sources 26a and 26b toward the display screen of the reflective liquid crystal display panel 22. Each of the minute structure must have a different inclination angle and height so that a light can be uniformly received at the display screen of the reflective liquid crystal display panel 22. The minute structures are difficult to design and to fabricate because of the plurality of inclination angles required. Moreover, because additional area is required for the display module 24 to house the auxiliary light sources 26a and 26b, the effective display area of the liquid crystal display panel 22 is reduced and the display module 24 is enlarged. Light incidence efficiency is low because the quantity of light incident to the reflective liquid crystal display panel 22 at different positions depends upon the distance from the auxiliary light sources 26a and 26b to each position on the liquid crystal display panel 22.

FIG. 4 shows a reflective LCD disclosed in U.S. Pat. No. 5,091,873. Referring to FIG. 4, the conventional reflective LCD includes a display module 34 pivotally attached to a main body 38 and mounted with a reflective liquid crystal display panel 32, and a light source 40 mounted releasably on the main body 38. The light source 40 includes a lamp 42 for generating light and a reflector 44 for reflecting light radiated from the lamp 42 toward the reflective liquid crystal display panel 32, thereby radiating light onto the display screen of the liquid crystal display panel 32. However, the reflective LCD increases the bulk of the main body 38, and the light source 40 complicates the structure.

As described above, in conventional reflective LCDs, it is difficult for light to be uniformly radiated onto the display screen, because of the location of the auxiliary light source. Moreover, it is difficult to make a product using a conventional reflective LCD that is light weight and small in dimension because of the need for an auxiliary light source.

SUMMARY OF THE INVENTION

Accordingly, the present invention is directed to an auxiliary light source unit for reflective liquid crystal display (LCD) that substantially obviates one or more of the problems due to limitations and disadvantages of the related art.

An object of the present invention is to provide an auxiliary light unit for a reflective liquid crystal display that is adapted to radiate light uniformly.

A further object of the present invention is to provide an auxiliary light unit for a reflective liquid crystal display that permits the liquid crystal display to be light weight and small in dimension.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an auxiliary light source apparatus for a reflective liquid crystal display according to an embodiment of the present invention includes a main body; a reflective display module installed pivotally at the main body; a support member opened and closed from and to the main body in opposition the reflective display module; and an auxiliary light source installed at the support member to radiate light onto the display area of the reflective display module.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
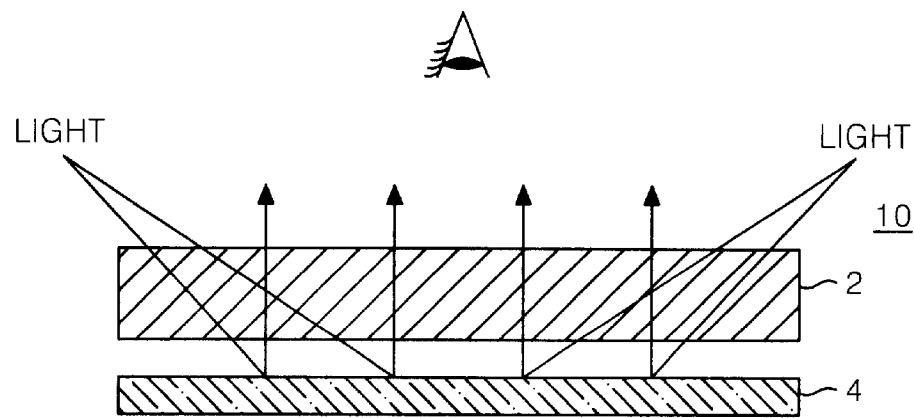
FIG. 1 is a schematic section view showing the structure of a conventional reflective liquid crystal display.
Figure 2:
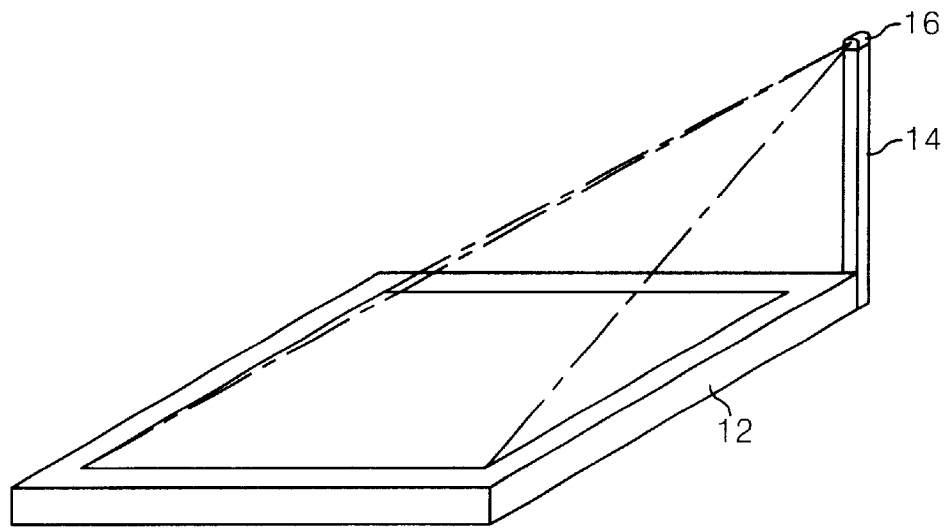
FIG. 2 illustrates a reflective liquid crystal display mounted with a conventional auxiliary light source.
Figure 3:
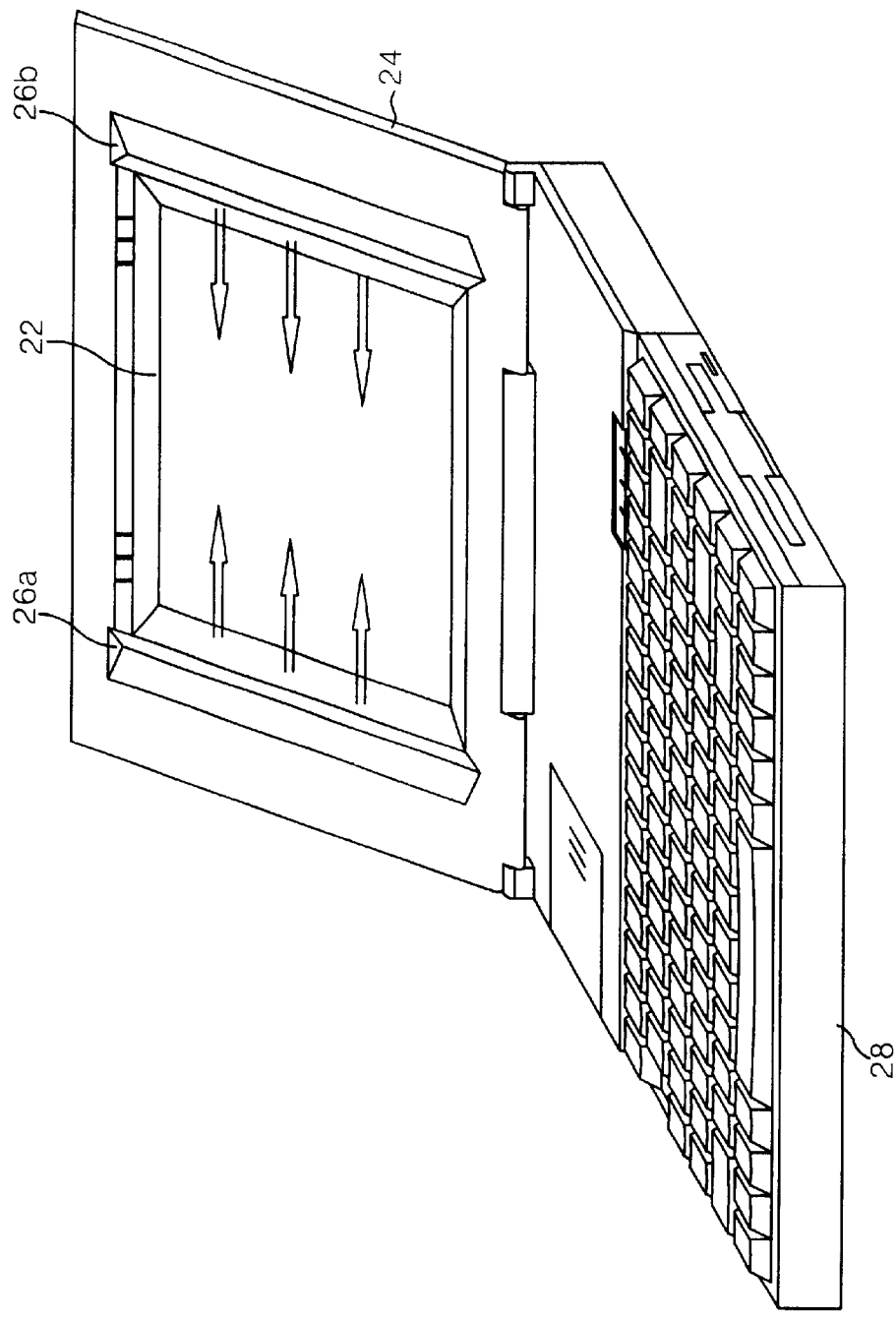
FIG. 3 illustrates a reflective liquid crystal display mounted with another conventional auxiliary light source.
Figure 4:
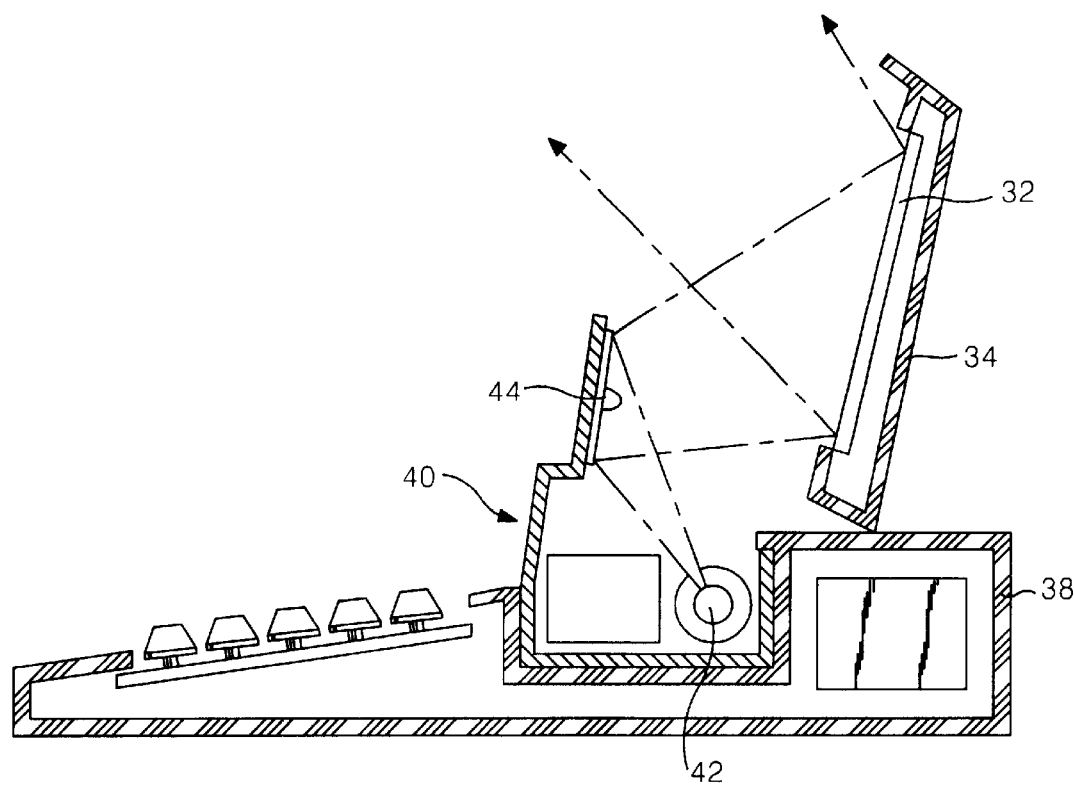
FIG. 4 illustrates a reflective liquid crystal display mounted with still another convention auxiliary light source.
Figure 5:
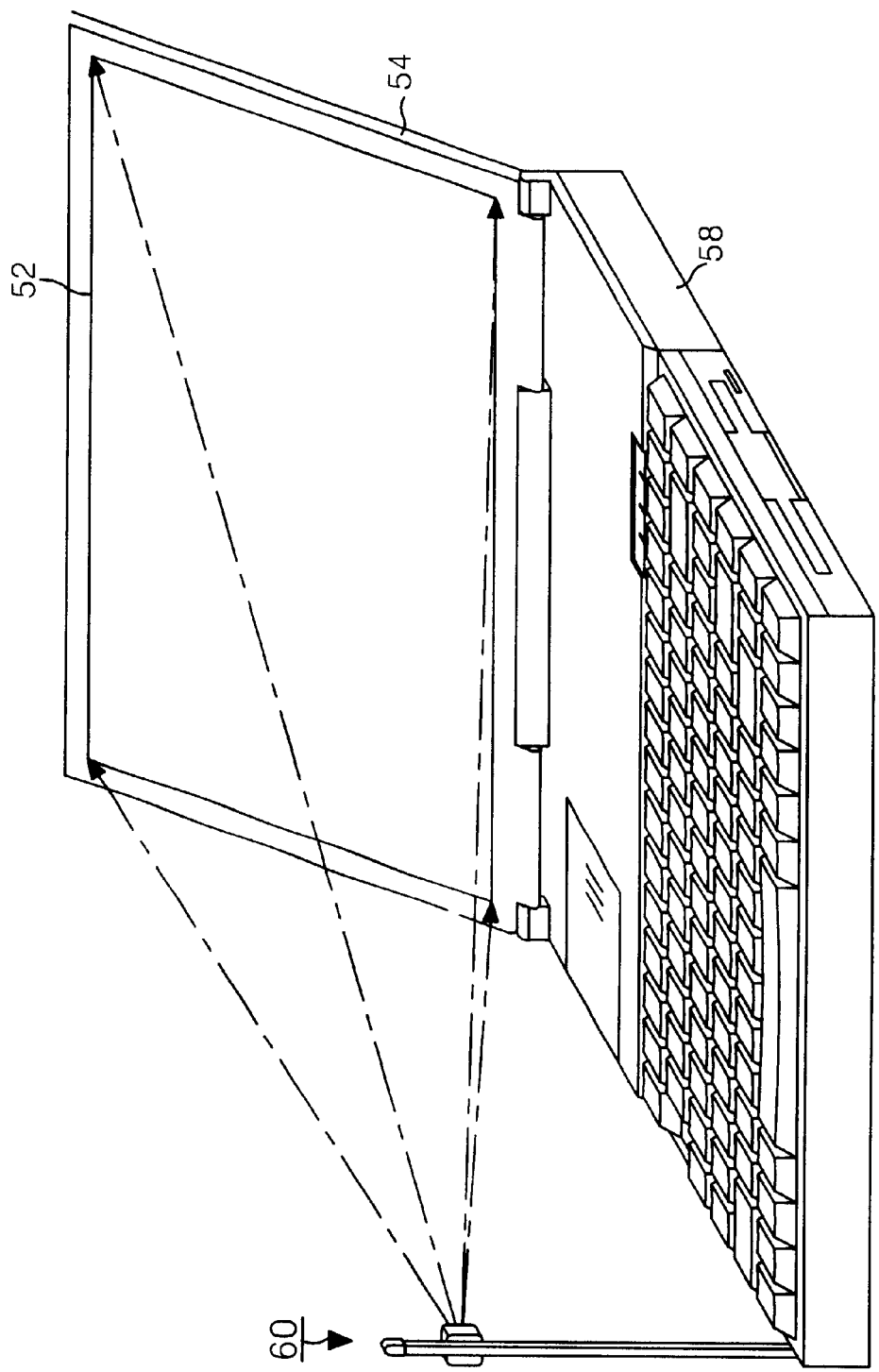
FIG. 5 is a perspective view of a reflective liquid crystal display according to a first embodiment of the present invention.
Figure 6:
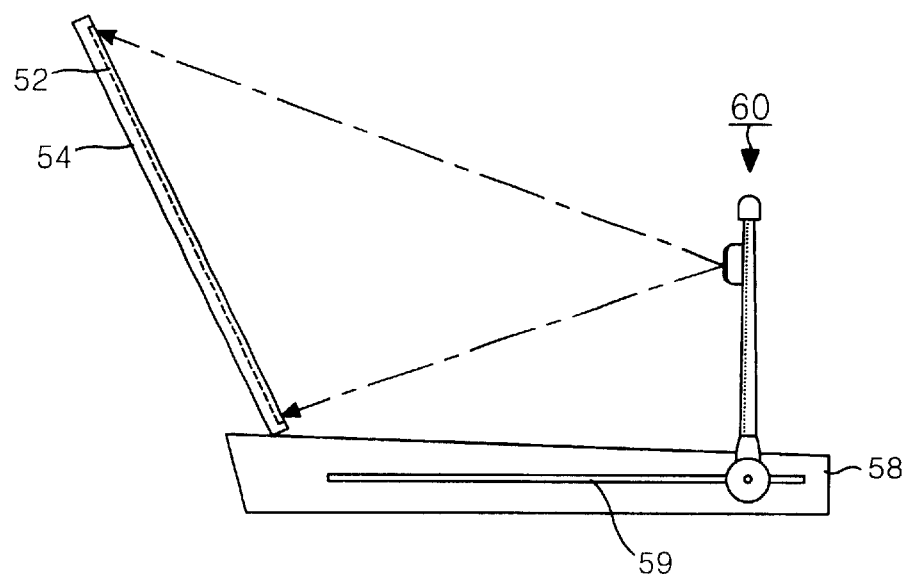
FIG. 6 is a left side view of the reflective liquid crystal display of FIG. 5.

Referring to FIG. 5 and FIG. 6, a reflective liquid crystal display (LCD) according to a first embodiment of the present invention, includes a display module 54 installed pivotally to a main body 58. The display module 54 houses a reflective liquid crystal display panel 52. An auxiliary light source 60 is installed on the side surface of the main body 58 in opposition to the reflective liquid crystal display panel 52 to radiate light onto the reflective liquid crystal display panel 52 at optimum uniformity and brightness. The auxiliary light source 60 is movable both linearly and pivotally within a guide slot 59 formed in the side surface of the main body 58.

Figure 7:
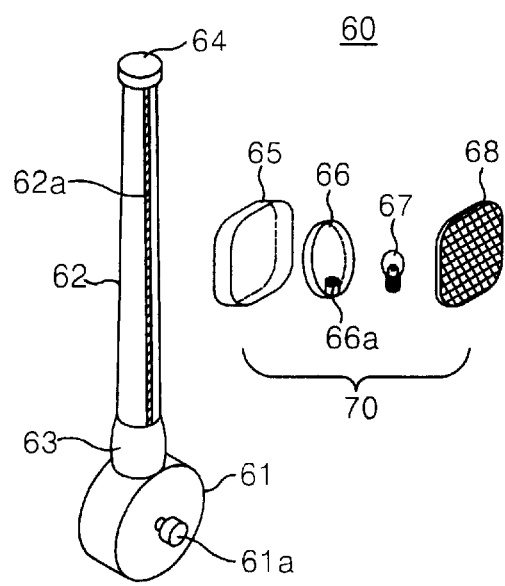
FIG. 7 is a detailed and exploded perspective view of the auxiliary light source in FIG. 5.
Figure 8:
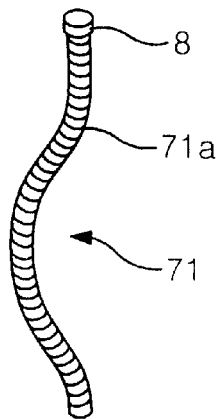
FIG. 8 shows other shape of the support bar in FIG. 7.

As shown in FIG. 7, the auxiliary light source 60 includes a rotating wheel 61 installed linear-movably and pivot-movably at the guide slot 59. A support bar 62 is installed rotatably at the rotating wheel 61, and a lamp module 70 is installed linear-movably and pivot-movably at the support bar 62. The rotating wheel 61 includes a protrusion 61a at the center of the front side and the rear side of the rotating wheel. The protrusion 61 is to be inserted into the guide slot 59. The circumference surface of the rotating wheel 61 is provided with a connecting bar 63. The support bar 62 is rotatably engaged with the connecting bar 63 of the rotating wheel 61. The support bar 62 has a guide slot 62a formed in the longitudinal direction, and one end of the support bar 62 is provided with a stopper 64. The stopper 64 prevents separation of a lamp holder 65. The support bar 62 supports a lamp module 70 and guides linear motion of the lamp module 70. The fixed support bar 62 may be replaced by a flexible support bar 71, the shape of which can be varied by manipulating a plurality of movable segments 71a as shown in FIG. 8. This support bar 71 is provided with a stopper 8 to prevent separation of the lamp module 70 at the upper end of the support bar 71.

As shown in FIG. 7, the lamp module 70 includes lamp holder 65, a reflector 66 received within the lamp holder 65, a lamp 67 installed within the reflector 66, and a collimator lens 68 shielding an opening of the reflector 66. The lamp holder 65 is linearmovably and pivot-movably inserted into the guide slot 62a of the support bar 62. The reflector 66 and the lamp 67 are received within the lamp holder 65. The lamp holder 65 protects the reflector 66 and the lamp 67 from external contamination or impact and provides stable support of the reflector 66, the lamp 67 and the collimator lens 68 on the support bar 62.

Figure 9:
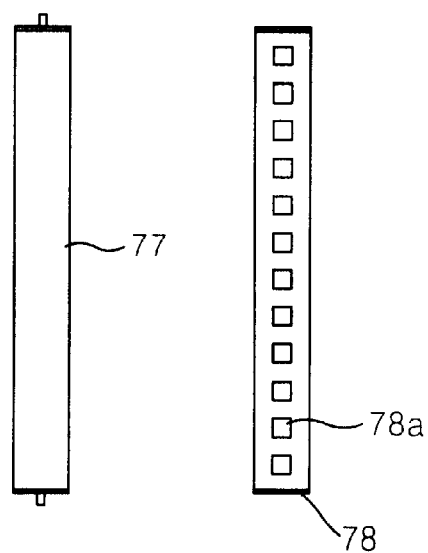
FIG. 9 shows other shape of the lamp in FIG. 7.

The reflector 66 has a concave shape around the lamp 67 and is provided with a socket 66a engaged with the lamp 67. The reflector 66 reflects light generated from the lamp 67 to the reflective liquid crystal display panel 52. The lamp 67 generates light between the reflector 66 and the collimator lens 68. The lamp 67 provides a point light source in this case, but it may be replaced by a line light source. As shown in FIG. 9, the line light source 77 may be a CCFL or an LED array 78 having white LEDs 78a arranged in series. The collimator lens 68 focuses light received from the lamp 67 and the reflector 66 onto the effective display area of the reflective liquid crystal display panel 52, providing improved light incidence efficiency over known devices. The auxiliary light source 60 is positioned to be biased toward the side rather than to the center of the reflective liquid crystal display panel 52. The collimator lens 68 compensates for any bias difference to correct the output angle of the light so that the light may be uniformly radiate the effective display area of the reflective liquid crystal display panel 52.

Figure 10:
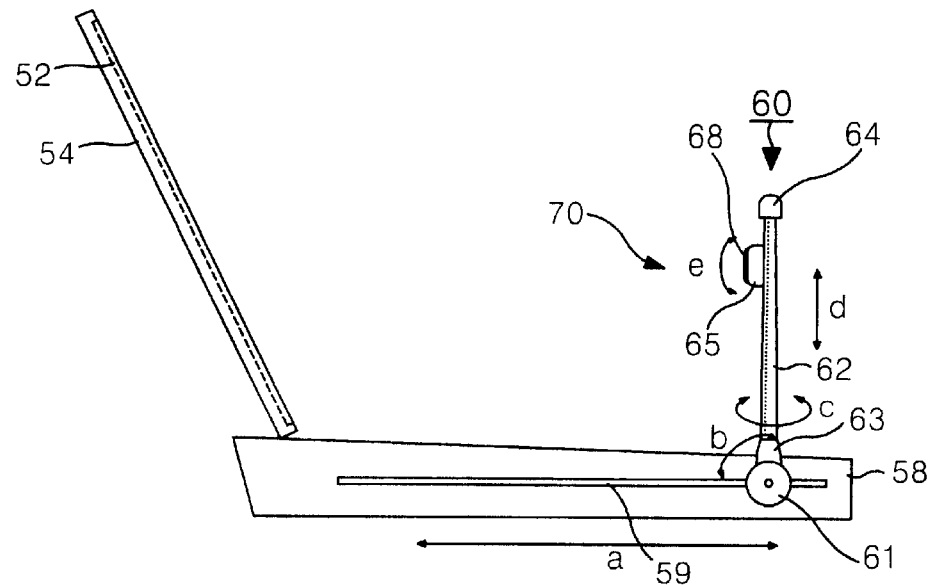
FIG. 10 is a side view showing an operation of the auxiliary light source in FIG. 5.
Figure 11:
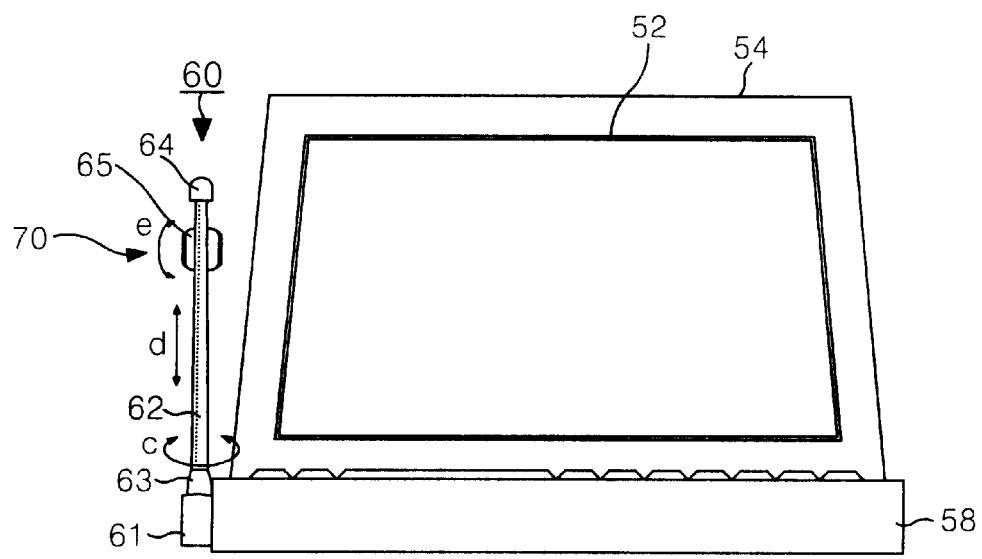
FIG. 11 is a front view showing an operation of the auxiliary light source in FIG. 5.

As shown in FIG. 10 and FIG. 11, in one embodiment of the present invention, the auxiliary light source 60 can be moved linearly along direction "a" of guide slot 59 of the main body 58 and can be moved pivotally along direction "b" by rotating wheel 61. Rotating wheel 61 is rotated around a rotation axis based on the protrusion 61a. Also, the lamp module 70 can be moved pivotally along direction "c" by rotating the support bar 62 on the connecting bar 63; linearly along direction "d" on the guide hole 62a of the support bar 62; and pivotally along direction "e" by means of the lamp holder 65. Accordingly, the auxiliary light source 60 can be freely moved into a position at which the uniformity and the brightness level are maximized with respect to the reflective liquid crystal display panel 52.

Figure 12:
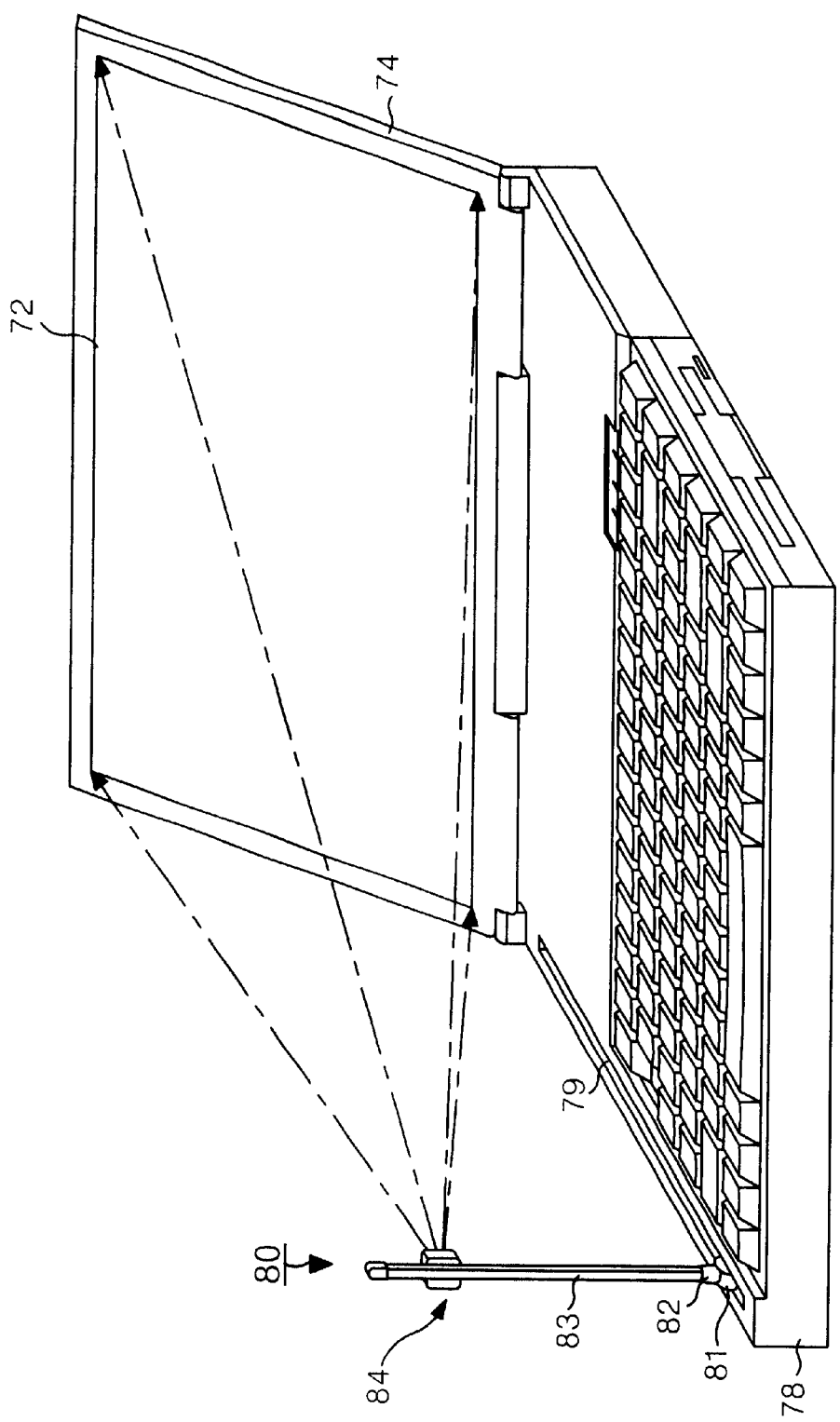
FIG. 12 is a perspective view of a reflective liquid crystal display according to a second embodiment of the present invention.
Figure 13:
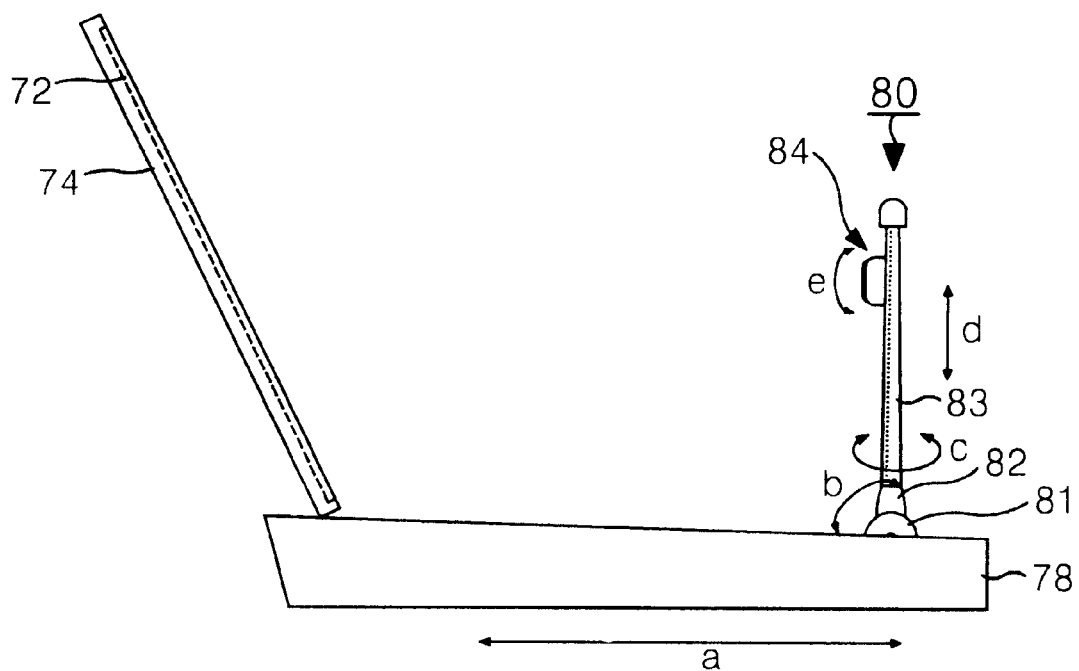
FIG. 13 is a side view showing an operation of the auxiliary light source in FIG. 12.
Figure 14:
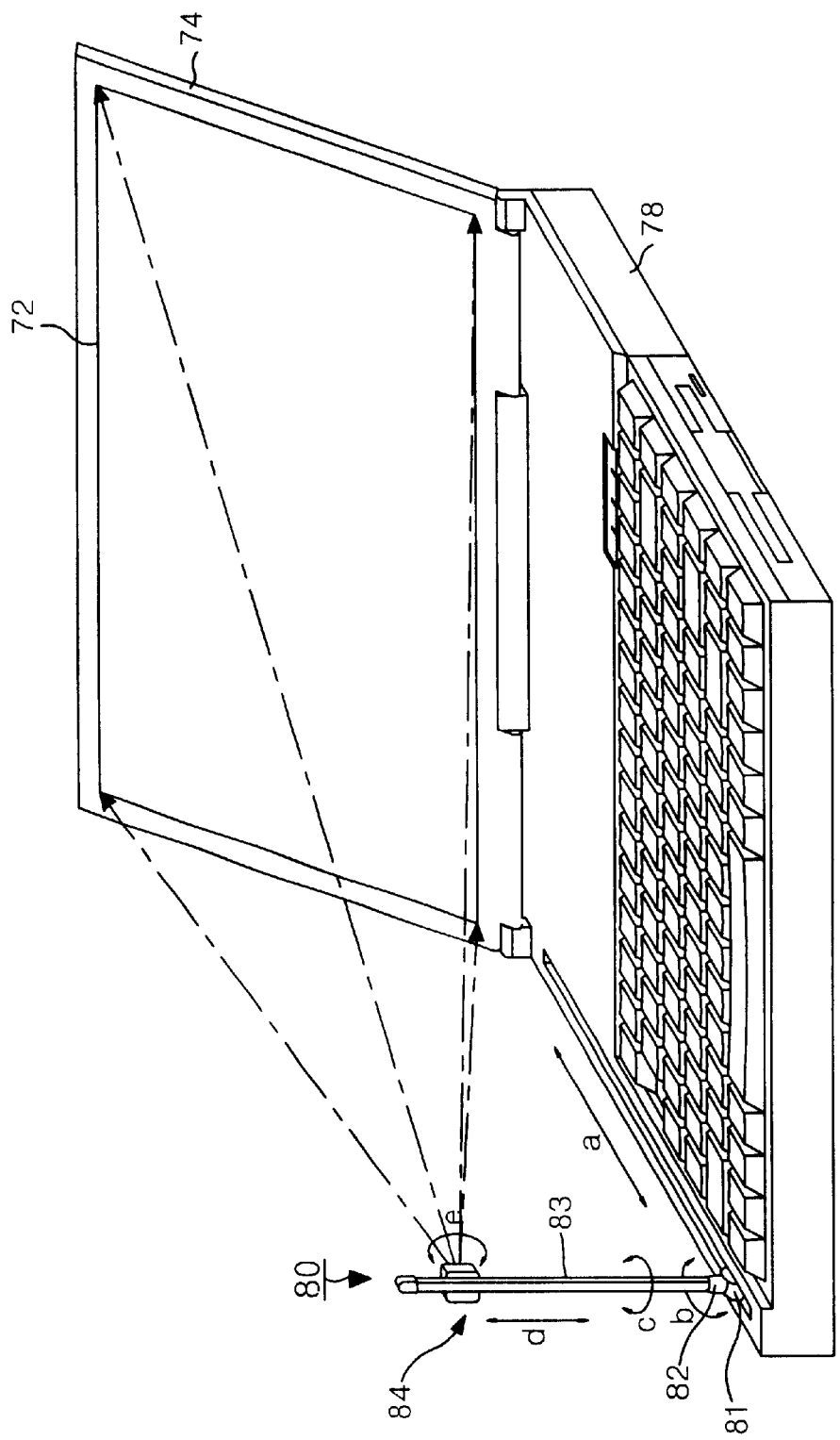
FIG. 14 is a front view showing an operation of the auxiliary light source in FIG. 12.

FIG. 12 illustrates a reflective LCD according to a second embodiment of the present invention. The reflective LCD includes a display module 74 pivotally attached to a main body 78. The display module 74 houses a reflective liquid crystal display panel 72. An auxiliary light source 80 is installed at the upper surface of the main body 78 in opposition to the reflective liquid crystal display panel 72. The auxiliary light source 80 is movable both linearly and pivotally. The auxiliary light source 80 consists of a rotating wheel 81, a support bar 83 and a lamp module 84. The rotating wheel 81 is linear-movably and pivotal-movably inserted into a guide slot 79 formed at the upper surface of the main body 78. The support bar 82 is rotatably engaged with a connecting bar 82 of the rotating wheel 81. The lamp module 84 is installed linear-movably and pivotal-movably along a guide slot formed at the support bar 83. As shown in FIG. 13 and FIG. 14, the lamp module 84 of the auxiliary light source 80 can be moved linearly along directions "a" and "d" and pivotally along direction "b", and rotatably along directions "c" and "e" in a fashion similar to that of the first embodiment of the present invention.

As described above, the auxiliary light source of the reflective LCD according to the present invention has a high degree of freedom of movement at a position opposed to the reflective liquid crystal display panel. The auxiliary light can be freely moved into a position in which light can be radiated onto the reflective liquid crystal display panel at maximum uniformity and brightness. Alternatively, the auxiliary light source may have a simple structure that permits only a minimum movement at a position at which light can be radiated onto the reflective liquid crystal display panel at maximum uniformity and brightness.

Figure 15:
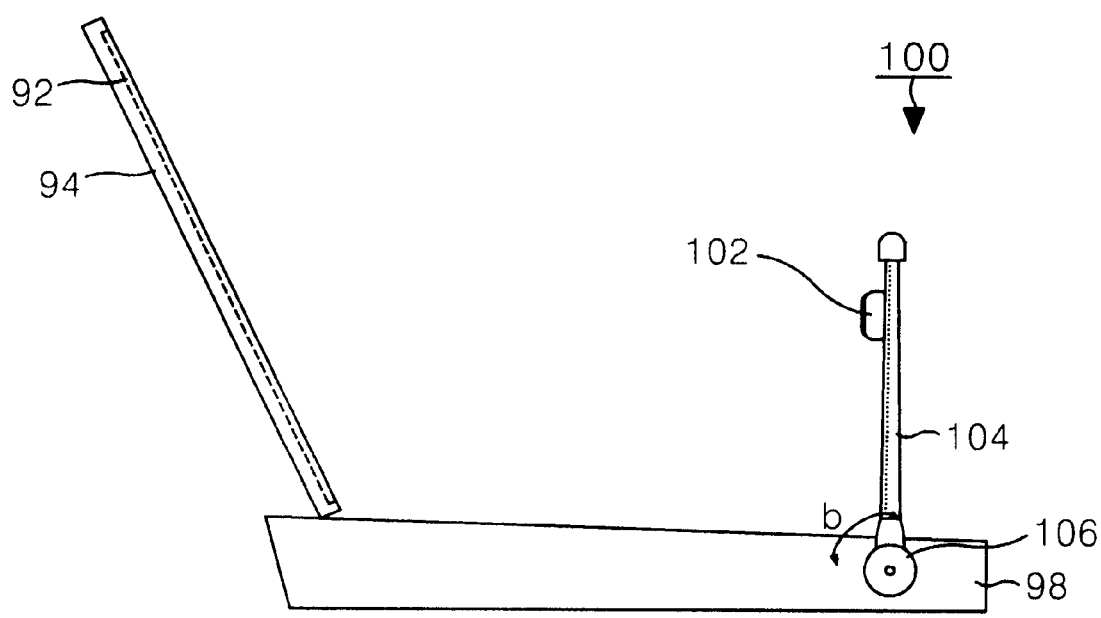
FIG. 15 is a side view of a reflective liquid crystal display according to a third embodiment of the present invention.

As shown in FIG. 15, a reflective LCD according to a third embodiment of the present invention includes a display module 94 pivotally attached to a main body 98. The display module 94 houses a reflective liquid crystal display panel 92. An auxiliary light source 100 is pivotally installed at the side surface of the main body 98 in opposition to the reflective liquid crystal display panel 92. The auxiliary light source 100 consists of a rotating wheel 106, a support bar 104 and a lamp module 102. The rotating wheel 106 is rotatably inserted into a specific hinge point on the side surface of the main body 98 in opposition to the reflective liquid crystal display panel 92. The rotating wheel 106 is installed at such a position that a light from the lamp module 102 is radiated onto the reflective liquid crystal display panel 92 at maximum uniformity and brightness. The support bar 104 is integral to the rotating wheel 106 to support a lamp holder 102. The lamp holder 102 is fixed to the end of the support bar 104 such that a light output surface is opposed to the reflective liquid crystal display panel 92. Since this lamp holder 102 has the substantially same configuration as that in FIG. 7, a detailed explanation of the lamp holder 102 is omitted. By such a configuration, the auxiliary light source 100 can be moved pivotally along direction "b" to be opened and closed from and to the main body 98.

In the above embodiments of the present invention, a power switch of the auxiliary light source is installed separately from that of the main body. In this case, the power switch of the auxiliary light source is linked to the rotating wheel. The switch is turned "on" when the auxiliary light source support bar is rotated in an "open" direction, i.e., the support bar is rotated away from the main body. The switch is turned "off" when the support bar is rotated in an inverse or "closed" direction, i.e., the support bar is rotated toward the main body.

As described above, because the auxiliary light source of the reflective LCD according to the present invention is installed at the main body in a direction opposed to the reflective liquid crystal display panel, it can uniformly illuminate the reflective liquid crystal display panel. Furthermore, the auxiliary light source is installed at the main body so that it can be freely moved. Thus, the light incidence efficiency can be improved, and the auxiliary light source is moved in accordance with a peripheral light quantity, thereby allowing a user to watch a picture or an image displayed at an optimum visual recognition. Moreover, because the light incidence efficiency is improved, the power consumption can be minimized. In addition, the auxiliary light source unit according to the present invention has a small dimension and a structure opened and closed from and to the main body, so that it permits fabrication of the LCD with a light weight and small dimension.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An auxiliary light source apparatus for a reflective liquid crystal display, comprising:
    a main body;
    a reflective display module installed pivotally at the main body;
    a support member connected to the main body in opposition to the reflective display module; and
    an auxiliary light source connected to the support member to radiate light onto the display area of the reflective display module.

2. The auxiliary light source apparatus according to claim 1, wherein the support member is configured to be opened and closed from a position adjacent to the main body.

3. The auxiliary light source apparatus according to claim 1, wherein the support member is linear-movably and pivotal-movably installed at the side surface of the main body.

4. The auxiliary light source apparatus according to claim 1, wherein the main body is provided with a guide slot for guiding linear motion of the support member, and said support member includes:
    a rotating wheel inserted linear-movably and pivotal-movably into the guide slot; and
    a support bar installed rotatably at the rotating wheel.

5. The auxiliary light source apparatus according to claim 4, wherein the support bar is provided with a guide slot for guiding a linear motion of the auxiliary light source.

6. The auxiliary light source apparatus according to claim 4, wherein the support bar has a fixed shape.

7. The auxiliary light source apparatus according to claim 4, wherein the support bar has a flexible shape.

8. The auxiliary light source apparatus according to claim 4, wherein the guide slot is formed on the side surface of the main body.

9. The auxiliary light source apparatus according to claim 4, wherein the guide slot is formed on the upper surface of the main body.

10. The auxiliary light source apparatus according to claim 1, wherein the support member is installed in such a manner to pivot around a hinge point at the side surface of the main body.

11. The auxiliary light source apparatus according to claim 10, wherein support member includes:
   a rotating wheel installed in such a manner to pivot around a certain hinge point at the main body; and
   a support bar formed integrally with the rotating wheel to support the auxiliary light source.

12. The auxiliary light source apparatus according to claim 11, wherein the rotating wheel is pivotally installed at a hinge point positioned at the side surface of the main body.

13. The auxiliary light source apparatus according to claim 11, wherein the support bar has a fixed shape.

14. The auxiliary light source apparatus according to claim 11, wherein the support bar has a flexible shape.

15. The auxiliary light source apparatus according to claim 1, further comprising:
   a light source for generating a light;
   a reflector for reflecting the light generated from the light source toward the reflective display module;
   a collimator lens for focusing the light from the light source and the reflector onto the display area of the reflective display module; and
   a holder for supporting the light source, the reflector and the collimator lens on the support member.

16. The auxiliary light source apparatus according to claim 15, wherein the holder is linear-movably and pivotal-movably installed at the support member.

17. The auxiliary light source apparatus according to claim 15, wherein the holder is fixed to one side of the support member.

* * * * *